US011763579B2

(12) United States Patent
Johnson (10) Patent No.: US 11,763,579 B2
(45) Date of Patent: Sep. 19, 2023

(54) OBTAINING PATTERNS FOR SURFACES OF OBJECTS

(71) Applicant: The Secretary of State for Defence, Salisbury (GB)

(72) Inventor: Geraint Johnson, Salisbury (GB)

(73) Assignee: The Secretary of State for Defence, Salisbury (GB)

( * ) Notice: Subject to any disclaimer, the term of this patent is extended or adjusted under 35 U.S.C. 154(b) by 0 days.

(21) Appl. No.: 17/615,568

(22) PCT Filed: May 7, 2020

(86) PCT No.: PCT/GB2020/000049
§ 371 (c)(1),
(2) Date: Nov. 30, 2021

(87) PCT Pub. No.: WO2020/245556
PCT Pub. Date: Dec. 10, 2020

(65) Prior Publication Data
US 2022/0237903 A1 Jul. 28, 2022

(30) Foreign Application Priority Data
Jun. 5, 2019 (GB) ...................................... 1907193

(51) Int. Cl.
*G06V 20/64* (2022.01)
*G06V 10/77* (2022.01)
(Continued)

(52) U.S. Cl.
CPC .......... *G06V 20/653* (2022.01); *G06N 3/126* (2013.01); *G06T 7/40* (2013.01); *G06T 15/04* (2013.01); *G06T 19/00* (2013.01); *G06V 10/751* (2022.01); *G06V 10/764* (2022.01); *G06V 10/776* (2022.01); *G06V 10/7715* (2022.01); *G06V 10/7796* (2022.01)

(58) Field of Classification Search
CPC ............... G06V 10/7796; G06V 10/56; G06V 10/7715; G06V 10/776; G06V 10/764;
(Continued)

(56) References Cited

U.S. PATENT DOCUMENTS 9,773,302 B2 * 9/2017 Wang ........................ G06T 7/38
10,055,882 B2 * 8/2018 Marin .................. H04N 13/257
(Continued)

OTHER PUBLICATIONS

International Patent Application No. PCT/GB2020/000049, International Preliminary Report on Patentability, dated Dec. 16, 2021.
(Continued)

*Primary Examiner* — Abderrahim Merouan
(74) *Attorney, Agent, or Firm* — Kilpatrick Townsend & Stockton LLP (57) ABSTRACT

A method, computer system and computer-readable medium for determining a surface pattern for a target object using an evolutionary algorithm such as a genetic algorithm, a parameterized texture-generating function, a 3D renderer for rendering images of a 3D model of the target object with a texture obtained from the parameterized texture generating function, and an object recognition model to process the images and predict whether or not the image contains an object of the target object's type or category. Sets of parameters are generated using the evolutionary algorithm and the accuracy of the object recognition model's prediction of the images with the 3D model textured according to each set of parameters is used to determine a fitness score, by which sets of parameters are scored for the purpose of obtaining future further generations of sets of parameters, such as by genetic algorithm operations such as mutation and crossover operations. The surface pattern is obtained based on the images of the 3D model rendered with a surface texture generated according to a high-scoring set of parameters.

19 Claims, 4 Drawing Sheets

(51) Int. Cl.
*G06V 10/778* (2022.01)
*G06V 10/776* (2022.01)
*G06V 10/764* (2022.01)
*G06N 3/126* (2023.01)
*G06T 7/40* (2017.01)
*G06T 15/04* (2011.01)
*G06T 19/00* (2011.01)
*G06V 10/75* (2022.01)

(58) Field of Classification Search
CPC ........... G06N 3/126; G06T 7/40; G06T 15/04; G06T 19/00
See application file for complete search history.

(56) References Cited

U.S. PATENT DOCUMENTS

| | | | | |
|---|---|---|---|---|
| 2011/0002531 | A1* | 1/2011 | Heisele | G06V 10/774 382/154 |
| 2016/0127715 | A1* | 5/2016 | Shotton | G06V 40/113 348/46 |
| 2017/0103510 | A1* | 4/2017 | Wang | G06T 7/33 |
| 2017/0169620 | A1* | 6/2017 | Bleiweiss | G06V 20/64 |
| 2018/0047208 | A1 | 2/2018 | Marin et al. | |
| 2018/0336677 | A1 | 11/2018 | Sloan et al. | |
| 2018/0357834 | A1* | 12/2018 | Bleiweiss | G06F 30/00 |
| 2019/0005711 | A1* | 1/2019 | Marin | G06T 15/506 |
| 2020/0242744 | A1* | 7/2020 | Schafer | G06T 15/08 |
| 2022/0237903 | A1* | 7/2022 | Johnson | G06T 15/04 |

OTHER PUBLICATIONS

International Patent Application No. PCT/GB2020/000049, International Search Report and Written Opinion, dated Aug. 7, 2020.
United Kingdom Patent Application No. 1907193.5, Search Report, dated Dec. 2, 2019.
United Kingdom Patent Application No. 2007301.1, Combined Search and Examination Report, dated Oct. 26, 2020.

* cited by examiner

OBTAINING PATTERNS FOR SURFACES OF OBJECTS

TECHNICAL FIELD

This disclosure relates to the field of machine or computer vision, and specifically to object recognition.

BACKGROUND

Machine or computer vision is commonly used to determine whether or not image data includes some specific object or feature. Human brains can perform such tasks with ease but computers have difficulty. The most successful algorithms are based on convolutional neural networks that have been trained on datasets, such as the datasets provided by the ImageNet project (http://www.image-net.org/), in which millions of images have been annotated by humans to indicate what objects are pictured. The ImageNet database contains thousands of categories, typically with hundreds or thousands of example images of objects falling within that category. For example, the 'teapot' category, described with the wording "a pot for brewing tea; usually has a spout and a handle" has 1590 different images of teapots at the time of writing of this disclosure. One such algorithm is the object recognition model known as 'Inception-v3', which may run on the 'TensorFlow' neural network framework. The model includes a model architecture, which defines the different layers and nodes of the neural network, and model weightings, which constitute the learned memory of the model and are developed from training on datasets such as the ImageNet database.

Recent work in this field has revealed the possibility of 'adversarial examples'. These are inputs to object recognition models that have been deliberately designed to cause the model to make a mistake in classifying the image, i.e. in recognizing an object in the image. For example, an image of a teapot might be misclassified by the object recognition model as a tennis racket, by failing to recognize the teapot in the image and instead recognizing a tennis racket. Typically such adversarial examples include a distortion that would not cause a human to misclassify the image. In many cases the presence of the distortion in the image might not even be noticeable to a human reviewing the image.

Adversarial examples have been used to identify weaknesses in object recognition models in order to motivate further development of the model. Therefore it may be advantageous to provide a new approach to developing an adversarial example.

In some cases, the techniques learned from developing adversarial examples may have application in designing new patterns for application to a real-world 3D object. An example might be to provide a teapot that would be misclassified as a tennis racket by an object recognition model reviewing an image of the teapot. Its surface pattern might be considered a camouflage pattern target at machine or computer vision.

The article "Synthesizing Robust Adversarial Examples" of Athalye et al, available on the ArXiv preprint server with the document reference arXiv:1707.07397, reports that standard methods for generating adversarial examples for neural networks do not consistently fool neural network classifiers in the physical world due to a combination of viewpoint shifts, camera noise, and other natural transformations. The article presents an algorithm for synthesizing examples that are adversarial over a chosen distribution of transformations and this algorithm is applied to manufacture a 3D adversarial object using 3D printing.

SUMMARY

It is desired to determine a pattern for application to an object's surface, such that computer software processing an image of the object with the pattern applied to the object's is less likely to identify the object correctly. Such computer software may be object recognition software that may use a neural network or a support vector machine. According to some embodiments, the computer software may be more likely to classify the object as being of a different type or category that the object's true nature as a result of the pattern applied to the object's surface.

Purely as an example, where the object is a teapot, the pattern applied to the object's surface may cause computer software processing an image of the object to determine the image to contain instead a tennis racket, a horse, a paperclip, a trumpet, or any other object that is not a teapot. Where the computer software processing the image outputs a list of confidence percentages for various categories, a confidence percentage representing the software's estimated likelihood that the image contains an object of the respective category, the pattern may cause the computer software processing the image to output a lower confidence percentage for the object's actual category than for other categories. For example, following processing of an image of the object with the pattern applied to the object's surface, the computer software may output the following list of categories and confidence percentages: 75% tennis racket, 22% horse, 20% paperclip, 14% trumpet, 8% teapot. Thus an analysis of the output of the computer software would prompt one to believe that it is unlikely that the image contains a teapot, whereas in fact it does, albeit one that has its surface patterned with the intention of deceiving such software.

Thus according to this disclosure, there is disclosed a method, computer system and computer-readable medium for determining a surface pattern for a target object using an evolutionary algorithm such as a genetic algorithm, a parameterized texture-generating model or function, a 3D renderer for rendering images of a 3D model of the target object with a texture obtained from the parameterized texture generating function, and an object recognition model to process the images and predict whether or not the image contains an object of the target object's type or category. Sets of parameters are generated using the evolutionary algorithm and the accuracy of the object recognition model's prediction of the images with the 3D model textured according to each set of parameters is used to determine a fitness score, by which sets of parameters are scored for the purpose of obtaining future further generations of sets of parameters, such as by genetic algorithm operations such as mutation and crossover operations. The surface pattern is obtained based on the images of the 3D model rendered with a surface texture generated according to a high-scoring set of parameters.

According to a first aspect of this disclosure there is provided a method of determining a surface pattern for a target object, the method comprising: providing a digital 3D model of a target object; providing a parameterized texture model that outputs a texture based on a set of parameters; providing at least one object recognition model configured to process one or more images and determine an output indicative of the object recognition model's confidence that the image contains an object matching a classification; for an initial generation of a genetic algorithm, providing a plurality of sets of parameters and determining a composite fitness score for each set of parameters of the plurality of sets of parameters; and, for one or more further generations of the genetic algorithm, generating a new plurality of sets of parameters based on the sets of parameters and fitness scores of a preceding generation and determining composite fitness scores for each set of parameters of the new plurality of sets of parameters, wherein determining a composite fitness score for a particular set of parameters comprises: generating a plurality of images by rendering the digital 3D model from a plurality of viewpoints around the digital 3D model with the digital 3D model textured based on the parameterized texture model and the particular set of parameters; determining at least one fitness score for each image of the generated plurality of images by processing the image using the at least one object recognition model, the at least one fitness score being based on the degree to which the at least one object recognition model failed to correctly classify the image as containing the target object; and determining a composite fitness score for the particular set of parameters based on the at least one fitness score generated for each of the images of the generated plurality of images.

According to a further aspect of this disclosure there is provided a computer system comprising a memory store and one or more processors, the one or more processors configured to: provide a digital 3D model of a target object; provide a parameterized texture model that outputs a texture based on a set of parameters; provide at least one object recognition model configured to process one or more images and determine an output indicative of the object recognition model's confidence that the image contains an object matching a classification; for an initial generation of a genetic algorithm, provide a plurality of sets of parameters and determine a composite fitness score for each set of parameters of the plurality of sets of parameters; and, for one or more further generations of the genetic algorithm, generate a new plurality of sets of parameters based on the sets of parameters and fitness scores of a preceding generation and determine composite fitness scores for each set of parameters of the new plurality of sets of parameters, wherein determining a composite fitness score for a particular set of parameters comprises: generating a plurality of images by rendering the digital 3D model from a plurality of viewpoints around the digital 3D model with the digital 3D model textured based on the parameterized texture model and the particular set of parameters; determining at least one fitness score for each image of the generated plurality of images by processing the image using the at least one object recognition model, the at least one fitness score being based on the degree to which the at least one object recognition model failed to correctly classify the image as containing the target object; and determining a composite fitness score for the particular set of parameters based on the at least one fitness score generated for each of the images of the generated plurality of images.

According to a further aspect of this disclosure there is provided a computer-readable medium, such as a non-transitory computer-readable medium, the computer-readable medium having instructions stored thereon that, when executed by one or more processors, cause the one or more processors to: provide a digital 3D model of a target object; provide a parameterized texture model that outputs a texture based on a set of parameters; provide at least one object recognition model configured to process one or more images and determine an output indicative of the object recognition model's confidence that the image contains an object matching a classification; for an initial generation of a genetic algorithm, provide a plurality of sets of parameters and determine a composite fitness score for each set of parameters of the plurality of sets of parameters; and, for one or more further generations of the genetic algorithm, generate a new plurality of sets of parameters based on the sets of parameters and fitness scores of a preceding generation and determine composite fitness scores for each set of parameters of the new plurality of sets of parameters, wherein determining a composite fitness score for a particular set of parameters comprises: generating a plurality of images by rendering the digital 3D model from a plurality of viewpoints around the digital 3D model with the digital 3D model textured based on the parameterized texture model and the particular set of parameters; determining at least one fitness score for each image of the generated plurality of images by processing the image using the at least one object recognition model, the at least one fitness score being based on the degree to which the at least one object recognition model failed to correctly classify the image as containing the target object; and determining a composite fitness score for the particular set of parameters based on the at least one fitness score generated for each of the images of the generated plurality of images.

The textures and patterns for a target object developed according to the techniques set out above and described in more detail below exploit a weakness in computer software that recognizes or identifies objects from images. Without wishing to be bound by theory, it is believed that state of the art object recognition models, including computational neural networks and support vector machine image classifiers, tend to exhibit poor spatial invariance; unlike in object recognition as performed by humans, they are believed not to perform 'feature binding' effectively, and thus perceive features of objects in a disjointed fashion. Providing an appropriate surface pattern to an object can fool such object recognition models because the object recognition models are believed to process details of the surface pattern separately from each other and separately from features of the underlying object, such as the object's silhouette.

Earlier developments in this field have focused on generating distortions to an image that would be largely imperceptible to a human but cause problems for a computer. However, such distortions are focused on the image itself. Other recent work has focused on developing surface patterns or textures for a 3D object but has relied on knowledge of the internal structure, design and implementation of the object recognition model. In some cases they have also relied on knowledge of the specific image data set on which the object recognition model was trained.

The techniques of this disclosure follow a 'black box' approach, in which internal knowledge of the object recognition model is not known or needed. The use of an evolutionary algorithm such as a genetic algorithm allows an optimised, or at least improved, solution to be obtained regardless of the internal working of the object recognition model and any knowledge thereof.

A feature of these techniques is the rendering of multiple images of 3D model of the target object—the object for which a deceptive surface pattern is being developed—with a candidate surface pattern applied. Images can therefore be obtained from multiple views around the 3D object and the candidate pattern can be assessed as to how well the pattern as a whole deceives a object recognition model.

The use of an evolutionary algorithm such as a genetic algorithm synergizes with the generation of candidate patterns from a set of parameters. A parameterized texture model may apply procedural generation techniques or stochastic generation techniques to generate, from a set of parameters, a texture to apply to a 3D model, which may rendered using 3D rendering techniques. Preferably the parameterized texture model is stable (mathematically smooth), in the sense that small or gradual changes to the parameters lead to small or gradual changes in the texture that is generated, which leads to better performance of the evolutionary algorithm in optimising the texture, as an improved or optimised set of parameters can emerge gradually through the evolutionary processes applied in the evolutionary algorithm. This preferred property may be understood by it allowing the fitness function to provide a smooth fitness landscape. In the language of a genetic algorithm, a small change in genotype results in a small change in phenotype.

In preferred embodiments, which may include methods, computer systems, or computer-readable media, pluralities of sets of parameters are generated and corresponding new composite fitness scores are determined until termination criteria are reached, such that an optimized set of parameters is obtained, and from which an optimized surface pattern may be obtained.

Such termination criteria may be to stop after some predetermined number of generations of the evolutionary algorithm, after a user instruction to stop the algorithm, after the best solution has not changed for some predetermined number of generations, of after a set of parameters has been obtained for which the fitness score meets a criterion, such as a predetermined threshold.

Alternatively or additionally, generating a new plurality of sets of parameters based on the sets of parameters and fitness scores of a preceding generation may comprise selecting one or more of the sets of parameters of the preceding generation based on the fitness scores determined for the sets of parameters and modifying the selected one or more sets of parameters.

Modifying the selected one or more sets of parameters may comprise performing a mutation operation on one or more of the selected one or more sets of parameters. In embodiments where a plurality of sets of parameters of the preceding generation are selected, and modifying the selected plurality of sets of parameters may comprise performing a crossover operation using two or more of the selected plurality of sets of parameters. Mutation and crossover operations may be performed together, including in a single combined operation on a set of parameters. Or an evolutionary algorithm may include mutation operations but not crossover operations, or may include crossover operations but not mutation operations.

Mutation and crossover operations simulate the genetic variation that may occur in the biological reproduction process to maintain a diversity in sets of parameters between generations. Selecting members of the existing population may comprise selecting the fittest of the existing population, such as selecting the n fittest members of the population, where n is arbitrary. Selecting sets of parameters from the existing population may comprise making a random selection from the existing population with a weighting toward the sets of parameters that are fitter. For example, the random selection process may begin with a uniform random variable and equal sized probability bins for each set of parameters in the existing population, but then adjust the size of each bin according to the fitness score of its associated set of parameters—the size adjustment for a set of parameters may be based on the value of the fitness score obtained for the set of parameters, or the ranking of its fitness score relative to fitness scores obtained for other sets of parameters in the population.

In some embodiments a number or proportion of sets of parameters of an existing population may be selected, and optionally maintained, to a subsequent population, e.g. more than 5%, more than 10%, more than 20%, more than 30%, more than 40%, more than 50%, more than 60%, more than 70%, more than 80%, or more than 90% of the existing population; this may lead to a more gradual convergence but maintains population diversity. In some embodiments, the sets of parameters with the highest fitness scores are maintained between generations, which ensures that the best solution found so far is not lost in mutation operations or crossover operations.

Alternatively or additionally, the views (angles, positions) used to determine a composite fitness score for a particular set of parameters may be varied between one or more of: each set of parameters, and each generation of the algorithm. It is believed that varying the views, whether between generations or even between sets of parameters, may lead to a more robust solution, particularly if there is some element of randomness in the variation of the views. This is because there may be a risk that a solution is 'tuned' to particular views. Such a solution may successfully deceive image recognition software from the particular views for which it has been optimised over many generations but then fail if tested from different views, such as from a from a slightly different viewing angle or viewing distance. By varying the views it becomes less likely that a solution will be tuned to specific views.

Alternatively or additionally, at least one of the views used to determine a composite fitness score for a particular set of parameters may be determined randomly. An example is to use a random number generator. As set out above, it is believed that the use of randomness in determining a view may mean that it is less likely that a solution is tuned to a particular view. Even when views are not varied, it may be helpful to decide a series of views for which all candidates are to be tested using some degree of randomness. This is to combat any possible tendency in human operators to choose only views on orthogonal axes, such as views selected from only the following list: a top view, a left view a front view, a bottom view, a right view, and a back view. A randomly determined viewing angle means that, while possible, it is unlikely that such a viewing angle will align with one of the orthogonal axes, and so a robustness of the solution might be expected to increase in most cases.

Alternatively or additionally, generating a plurality of images by rendering the digital 3D model may comprise varying one or more of the following between at least some of the plurality of images: lighting condition, environmental condition, projection, model reflectivity, and background scenery. All of these are intended to improve the robustness of any solution, such that the solution is less susceptible to variations in any such condition. The lighting condition may be the direction of any illumination on the 3D model in the rendering process, including any background or diffuse lighting. The environmental condition may be any simulated weather conditions, such as obscuring weather conditions such as fog or rain, or optical distortions such as those as caused by varying densities of air. The environmental conditions may be simulated by applying noise or distortions to the resulting images. The projection may be varied, such as from an orthographic projection to a perspective projection. The background scenery can be varied, or can be constant, or can be entirely non-existent, i.e. with the images showing the 3D model against a flat background. The model reflectivity affects the degree to which the object provides mirror-like specular reflections. It affects the image according to the particular illumination conditions and, with a high enough reflectivity, any additional scenery in the rendered 3D image. Optical effects, such as a depth of focus or a lens flare or a lens distortion as may occur in images captured from a camera may also be simulated and varied as set out above.

Alternatively or additionally the target object may have multiple configurations and a composite fitness score for a set of parameters incorporates results views of the target object in multiple configurations with the pattern according to the set of parameters applied to the surface. For example, a teapot may have a configuration in which a lid is removed. Thus the composite fitness score may include images generated with the lid in place and with the lid removed. In other examples, a target object may have one or more joints or links by which one portion of the target object may be moved relative to another; the composite fitness score may include images generated with the target object in multiple configurations, with one portion of the target object moved relative to other portion between one or more images.

Alternatively or additionally, determining at least one fitness score for each image of the generated plurality of images by processing the image using the at least one object recognition model may comprise processing the image using a plurality of object recognition models to obtain a plurality of fitness scores for the image. Different object recognition models operate in different ways. For example, neural network models may differ in their architecture, having different numbers of layers and nodes. The approach of this disclosure is to treat each object recognition model as a 'black box' and not be overly concerned as to how the object recognition model operates. In this way it is straightforward to test images with more than one object recognition model. It is believed that a solution obtained by testing against two different object recognition models is more likely to perform well against a third object recognition model against which the solution has not previously been tested and less likely to only perform well against the specific object recognition model or models against which it has previously optimised. In other words, it may be better able to exploit features shared by object recognition models in general rather than the specific features of a specific object recognition model, and thus the solution may be expected to perform better against an unknown object recognition model.

Alternatively or additionally, the parameterized texture model may output a solid texture and rendering the digital 3D model may comprise determining colour values at positions within the solid texture that correspond to positions on the digital 3D model. This approach has an advantage in that, while the computation may need to be performed in 3D, which may cause an increase in computational cost, the resulting images show the surface without introducing distortions and discontinuities.

Alternatively or additionally, the parameterized texture model may output a planar texture and rendering the digital 3D model may comprise mapping the planar texture to the surface of the digital 3D model. This approach has an advantage in that it avoids having to compute the pattern or texture in three dimensions. But more care must be taken with the mapping of the texture to the surface to avoid unintended distortions and discontinuities in the texture in the images as rendered.

The parameterized texture model may comprise the generation of one or more underlying noise fields, using simplex noise or Perlin noise for example, which may then be processed using a plurality of parameterized functions controlled by a set of parameters.

Alternatively or additionally, the generation of a texture using the parameterized texture model may comprise computing fractal procedural textures based on a set of parameters, including the generation of detail over a plurality of different length scales.

Alternatively or additionally, the generation of a texture using the parameterized texture model may comprise using a compositional pattern-producing network.

Alternatively or additionally, determining a fitness score for an image may comprise processing the image using the at least one object recognition model to obtain, for each of one or more categories, an indication of the object recognition model's confidence that the image contains an object of the category. This may be provided automatically as an output of the object recognition model.

In some preferred embodiments, the determined fitness score for an image varies inversely with the object recognition model's confidence that the image contains an object of the same category as the target object. If the confidence is a percentage value, the fitness score may be equal to 100% minus the confidence. In other cases the fitness score may be equal to the reciprocal of the confidence. Other formulas are possible—the intention is to provide a scoring function that scores sets of parameters which have a lower confidence for the category of the target object higher than sets of parameters which have a higher confidence for the category of the target object.

In other preferred embodiments, the determined fitness score for an image may vary directly with the object recognition model's confidence that the image contains an object of a predefined category that is different from the category of the target object. In this way, a texture or pattern may be developed that is intended to cause an object recognition model to recognize the target object as being of a particular category that is different to the category of the target object. Purely as an example, if the target object is a teapot and it is intended that it should have a surface pattern that would cause an object recognition model to recognize an image of the target object as containing instead a tennis racket, then the fitness score may be the confidence of the object recognition model that the image contains a tennis racket. Again this formula is an example and many other formulas might be used—the intention is to provide a scoring function that scores sets of parameters which have a higher confidence for the particular different category to which the target object does not belong higher than sets of parameters which have a higher confidence for this particular different category to which the target object does not belong.

Alternatively or additionally, determining a composite fitness score for the particular set of parameters based on the fitness scores generated for each of the images of the generated plurality of images may comprise obtaining an average of the fitness scores. In some embodiments that average is a median of the fitness scores generated for each of the images of the generated plurality of images. In some embodiments that average is a mid-range of the fitness scores generated for each of the images of the generated plurality of images, defined as the arithmetic mean of the highest and lowest values of the fitness scores generated for each of the images of the generated plurality of images. In some embodiments that average is a mean of the fitness scores generated for each of the images of the generated plurality of images, which may be an arithmetic mean, a geometric mean, or a harmonic mean, or may be an infinity power mean, which returns the maximum or minimum values of the fitness scores, according to whether the power is positive or negative infinity. In some circumstances it may be desirable to select an averaging function that is weighted toward the lower fitness scores. In other circumstances it may be desirable to select an averaging function that is weighted toward the higher fitness scores. It may be desirable to vary the averaging function over generations as the evolutionary algorithm proceeds, initially weighting toward lower fitness scores and later weighting toward higher fitness scores, or initially weighting toward higher fitness scores and later weighting toward lower fitness scores; this may be implemented conveniently via the Holder mean with the power parameter varied as desired.

The techniques of this disclosure may provide allow users to determine effective camouflage patterns for multiple target objects, such as multiple individual objects within a collection of objects (e.g. multiple teapots within a collection of teapots), each having an individual camouflage pattern that is effective against machine or computer vision image classifiers.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF DRAWINGS

The invention will be described in more detail by way of example with reference to the accompanying drawings, in which.

DETAILED DESCRIPTION

Figure 1:
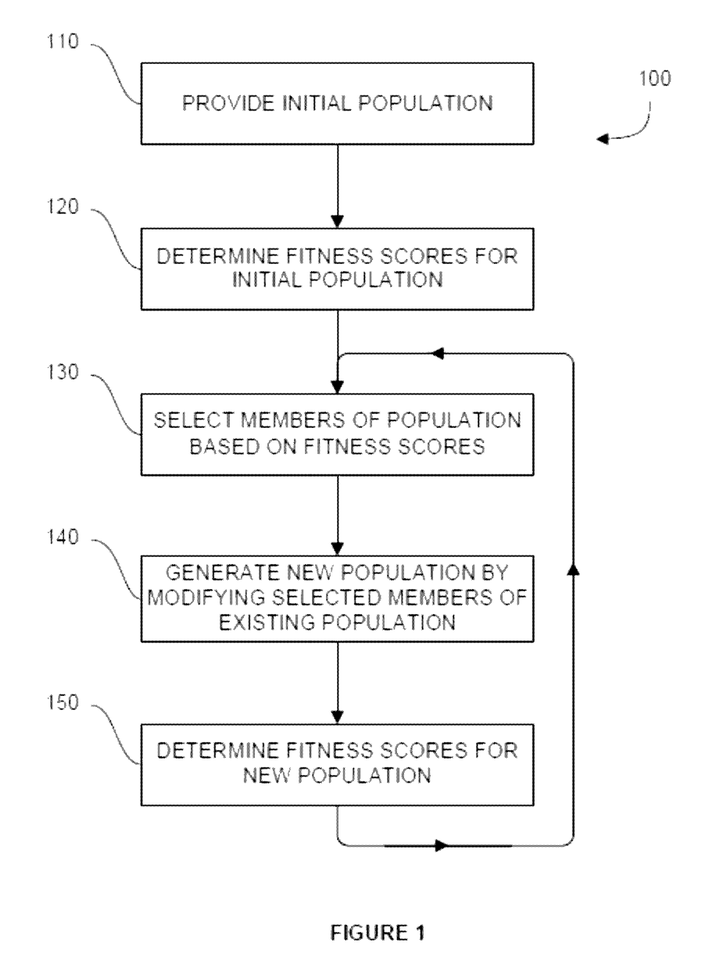
FIG. 1 is a flowchart illustrating an example process according to an aspect of this disclosure.

FIG. 1 is a flowchart illustrating an example process 100 for optimizing a pattern for application to a target object according to a genetic algorithm, a genetic algorithm being an example of an evolutionary algorithm. The genetic algorithm is used to obtain an optimized solution. In the context of this disclosure, the optimized solution is a set of parameters that define a pattern for application to a target object to cause an object recognition model processing an image of the object to incorrectly classify the target object, or fail to recognize that the image contains an object of the target object's type.

The process 100 comprises a first step 110 that is to provide an initial population. In this example, the initial population consists of multiple 'genomes'. Each genome is a set of parameters in the form of a series of numbers. These may be set randomly, or evenly distributed throughout a possible solution space, or in any other way, whereby the intention is to provide a variety of different possible trial candidate solutions.

The second step 120 is to determine fitness scores for the initial population. In this case, for each candidate set of parameters in the initial population, an estimate as to how well a pattern generated according to the candidate set of parameters and applied to the surface of the target object causes the computer software to incorrectly classify the target object. Briefly, the set of parameters are used with a parameterized texture model to determine a texture for the surface of a digital 3D model. Images are then rendered of the digital 3D model from a variety of different directions and positions. These are then each tested with an object recognition model, or even multiple object recognition models, to determine a prediction from the object recognition model or models as to how likely the image is to contain an object of the category or class to which the digital 3D model belongs. From the predictions made for the images, the set of parameters is scored as to the effectiveness the texture generated from the set of parameters at causing the objection recognition model or models to fail to correctly categorize images containing the digital 3D model rendered with the generated texture.

The third step 130 is to generate a new population by modifying selected members of the existing (initial) population. So that the solving process does not waste computing resources on unpromising candidates, a new population is generated by focusing on more promising candidates, i.e. sets of parameters that are determined to have higher fitness scores, and discarding less promising candidates, i.e. sets of parameters that are determined to have lower fitness scores.

The fourth step 140 is to generate a new population by modifying the selected members of the existing population. New sets of parameters are created from the more promising candidates of the existing population and added to the new population. The new sets of parameters are created in a manner that simulates a biological breeding process to produce a new generation in biological evolution. Some new sets of parameters are created by 'mutating' one or more sets of parameters selected, based on their respective fitness scores, from the existing population. Other new sets of parameters may be created by combining subsets of parameters from multiple sets of parameters of selected from the existing population in a manner analogous to chromosomal crossover in biological reproduction. For example, a subset of a first set of parameters corresponding to the first n parameters in sequence may have appended to it a subset of a second set of parameters corresponding to parameters n+1 to L, where L is the length of the set of parameters (i.e. the number of parameters in the set of parameters), where n, the location at which the sets of parameters—'genomes'—are cut, may be predetermined, randomly determined, or chosen in some other way. Some new sets of parameters are created using combining subsets of parameters from multiple sets of parameters and mutating the parameters before and/or after the combining of the subsets. In this way, a new population is generated.

The fifth step 150 is to determine fitness scores for the new population. This may be by the same process as in the second step, or may be subject to variations, with the aim of obtaining a more robust solution that may have better real-world application.

At this point, the process is repeated, by which the third step 130, fourth step 140 and fifth step 150 are performed for the new population based on the fitness scores determined for the new population. Thus an optimized solution may be obtained over subsequent generations.

In some embodiments this process is continued indefinitely. In other embodiments the process is stopped when a desired termination criteria is met. For example, the process may be stopped when a fitness score is determined for a set of parameters and the fitness score meets a threshold. In some embodiments the process is stopped when the process reaches a steady state, indicating that at least a local maximum has been obtained. One approach to determining that the process has reached a steady state is to check if parameter set with the highest fitness score is unchanged for at least a given or predetermined number of generations, such as 2, 3, 5, 10, 30, 100, 300, 1,000, 3,000, or 10,000 generations. In some embodiments the process is stopped after a predetermined number of generations. The termination criteria may include some or all of the above-described conditions. For example, the termination criteria may require the threshold to have been reached by a fitness score and that a predetermined number of generations have passed since the computation began, or that the highest fitness score is unchanged for a predetermined number of generations.

In an embodiment, the process 100 is implemented using the genetic algorithm functionality of the Global Optimization Toolbox of the MATLAB™ computing environment, as provided by The MathWorks, Inc. In another embodiment, the process 100 is implemented in Python using the Distributed Evolutionary Algorithms in Python (DEAP) computation framework available from https://github.com/deap. In another embodiment, the process 100 is implemented in C++ using the Open BEAGLE evolutionary computation framework available from https://github.com/chgagne/beagle.

Figure 2:
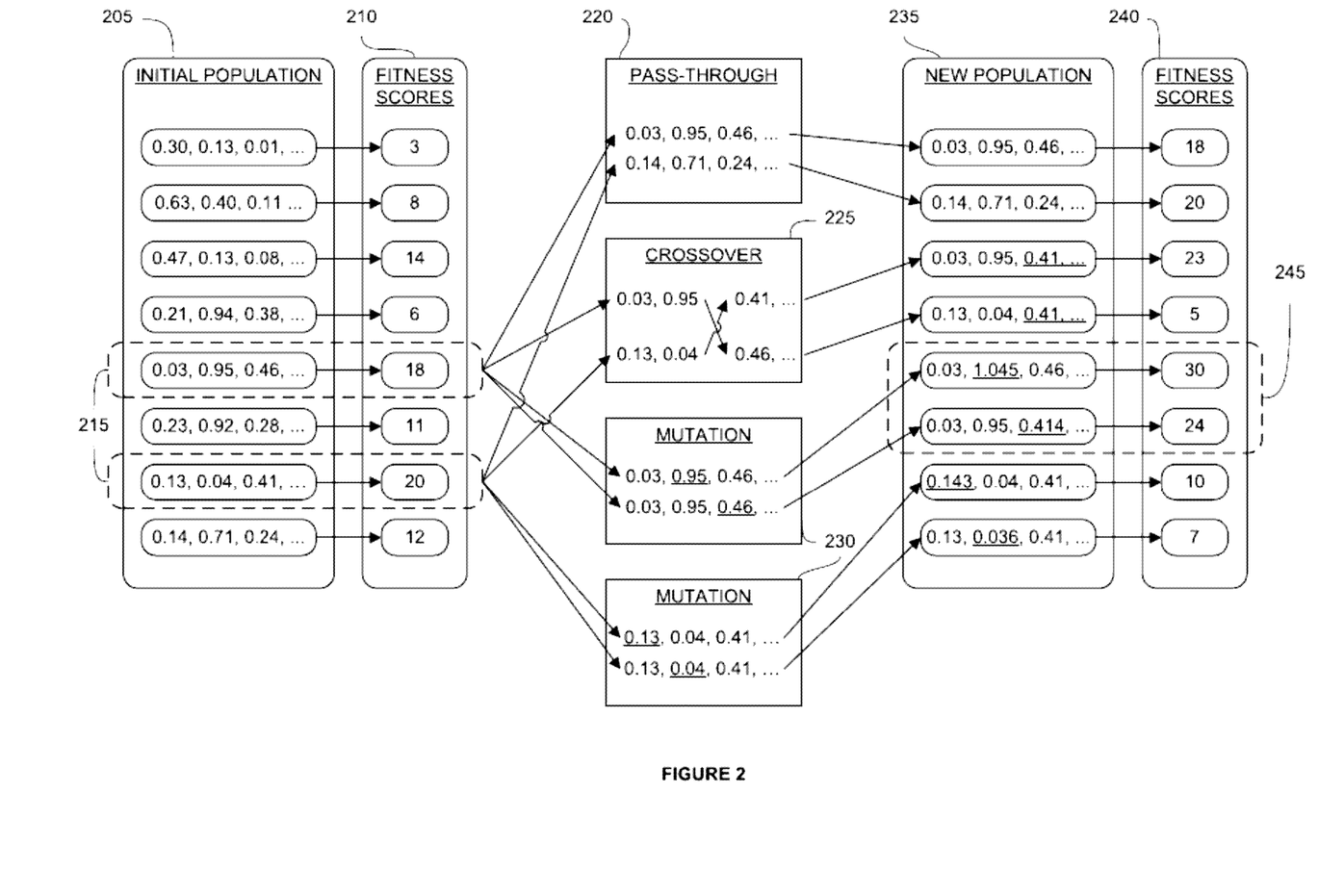
FIG. 2 illustrates a portion of the example process of FIG. 1.

FIG. 2 illustrates a portion of the process 100 of FIG. 1 in more detail. Firstly, as per the first step 110 of the process 100 of FIG. 1, an initial population 205 of sets of parameters is provided. In this example, 8 sets of parameters are provided, and the sets of parameters are each represented by plurality of random floating (or fixed) point numbers, of which only the first three are shown for brevity. A set of fitness scores 210 is determined using the sets of parameters of the initial population 205, the set of fitness scores 210 consisting of a fitness score for each set of parameters of the initial population 205.

The fitness scores are assessed and a selection 215 is made from the sets of parameters of the initial population 205, the selection 215 consisting of the two sets of parameters for which the highest fitness score was determined. From the selection 215, a new population 235 is determined using various evolutionary operations, including a 'pass-through' operation 220, a 'crossover' operation 225, and 'mutation' operations 230. In practice one or more of these evolutionary operations can be omitted although having all three may be advantageous.

The most straightforward operation of these is the pass-through operation 220, by which the two selected sets of parameters of the selection 215 from the initial population 205 are placed unchanged into the new population 235. Thus the first set of parameters in the new population 235 is identical to the fifth set of parameters in the initial population 205, i.e. 0.03, 0.95, 0.46, . . . , and the second set of parameters in the new population 235 is identical to the seventh set of parameters in the initial population 205, i.e. 0.14, 0.71, 0.24, . . . .

The crossover operation 225 operates on multiple sets of parameters as input thereto. For example, the crossover operation may take as input two sets of parameters that correspond to a biological 'parent' and output one or more sets of parameters that correspond to a biological 'child'. In the crossover operation 225 shown in FIG. 2, a crossover point on both sets of parameters is determined randomly. In this case it is the interval between the second and third parameters of the sets of parameters. Parameters to the right of the crossover point are swapped between the two parent chromosomes to obtain two offspring. In this manner, the third and subsequent parameters of the fifth set of parameters of the initial population 205 are appended to the first and second parameters of the seventh set of parameters of the initial population 205 to obtain the third set of parameters of the new population 235. The third and subsequent parameters of the seventh set of parameters of the initial population 205 are appended to the first and second parameters of the fifth set of parameters of the initial population 205 to obtain the fourth set of parameters of the new population 235.

The mutation operation 230 operates on one or more sets of parameters as input thereto. It outputs new sets of parameters derived from an input set of parameters modifying one or more bits of the input set of parameters. In the example shown in FIG. 2, two new sets of parameters are generated from each of the selected sets of parameters 215 from the initial population 205.

From the fifth set of parameters of the initial population 205, the fifth and sixth sets of parameters of the new population 235 are obtained. For the fifth set of parameters of the new population 235, the second number of fifth set of parameters of the initial population 205 is modified. In this case, it is increased by 10%. Thus 0.03, 0.95, 0.46, . . . becomes 0.03, 1.045, 0.46, . . . , which is provided as the fifth set of parameters of the new population 235. For the sixth set of parameters of the new population, the third number of the fifth set of parameters of the initial population 205 is decreased by 10%. Thus 0.03, 0.95, 0.46, . . . becomes 0.03, 0.95, 0.414, . . . , which is provided as the sixth set of parameters of the new population.

From the seventh set of parameters of the initial population 205, the seventh and eighth sets of parameters of the new population 235 are obtained. For the seventh set of parameters of the new population 235, the first number of seventh set of parameters of the initial population 205 is modified. In this case, it is increased by 10%. Thus 0.13, 0.04, 0.41, . . . becomes 0.143, 0.04, 0.41, . . . , which is provided as the seventh set of parameters of the new population 235. For the eighth set of parameters of the new population, the second number of the seventh set of parameters of the initial population 205 is decreased by 10%. Thus 0.13, 0.04, 0.41, . . . becomes 0.13, 0.036, 0.41, . . . , which is provided as the eighth set of parameters of the new population.

In this way the new population 235 is obtained based on the selected sets of parameters 215 of the initial population. This process is repeated over successive generations to obtain an improved or optimized set of parameters. Thus new fitness scores 240 are determined for the new population 235, and a new selection 245 is made based on new fitness scores 240, in this instance selecting the fifth and sixth sets of parameters of the new population 235 on account of their fitness scores being the two highest. The process of generating another population based on the new selection 245 thus repeats, using pass-through operations 220, crossover operations 225 and mutation operations 230.

In the process illustrated in FIG. 2, simple examples of crossover and mutation operations are presented but the techniques of this disclosure are not limited to these examples.

In the case of crossover operations there may be more than one crossover point. For example, there may be two crossover points, in which the generated set of parameters consists of first and last portions from a first parent and an inner parent from a second parent. There may be more than two parents. For example, if at least three sets of parameters are selected from the initial population 205 (third, fifth and seventh sets of parameters based on the highest fitness scores 210 in FIG. 2), then three parents can be provided as input to the crossover operation 225 and so all three parents may have subsets in the new set of parameters.

In some embodiments the sets of parameters may undergo a crossover operation on a bit-by-bit basis, whereby binary representations of the sets of parameters—such as multiple floating or fixed point numbers in sequence—are crossed over at a location along the sequences of bits that represent the sets of parameters; such a location may be at an intermediate location within a binary representation of a floating point number.

In the case of mutation operations, the example shown in FIG. 2 modifies one number of a set of parameters by increasing or decreasing it by 10%. This 10% figure is arbitrary and may be randomly determined for each mutation. One example is by adding or subtracting a random amount between 1% and 100% of its current value. Another example is to add a random number according to a Gaussian distribution. Another example is to replace the number entirely with a random number, which may be a uniformly distributed random value within upper and lower bounds for that particular parameter within the set of parameters, or be normally distributed and centred on the average of the upper and lower bounds. Mutations may also take place on a bit-by-by basis. For example, the mutations may operate on binary representations of the sets of parameters, whereby the mutations operate by randomly considering whether or not to mutate each bit, wherein the probability of each bit being flipped is 1/L, where L is the length of the binary number that represents the set of a parameters. Given that there is the possibility that none of the bits would be flipped, it may not be necessary to have an explicit pass-through operation in such an algorithm; on the other hand a pass-through operation may still be desirable, at least for the fittest candidates, to ensure that the best solutions obtained are not lost. Another mutation operation may be to flip all bits at the same time, i.e. invert the binary representation of either a number of the set of parameters, or the whole set of parameters. Some or all of the above-described operations may be combined in the same algorithm, and even in the same mutation operation or crossover operation.

In an embodiment, the pattern or texture to be applied to the surface of a target model is procedurally generated based on a set of parameters. This is implemented using simplex noise, as described in U.S. Pat. No. 6,867,776 B2, although other techniques for generating noise, such as Perlin noise, may additionally or alternatively be used. Cope for an implementation of Perlin noise is provided on the Wikipedia entry for Perlin noise (https://en.wikipedia.org/wiki/Perlin_noise accessed 10 Apr. 2019).

Various parameterized functions are applied to the simplex noise to generate textures.

Figure 3:
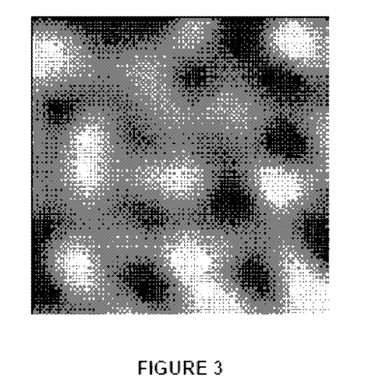
FIG. 3 is a dithered image of a greyscale simplex noise field.

FIG. 3 illustrates an example of a square image, of which each pixel is defined by a simplex noise field between values of 0 and 1, wherein 0 represents black and 1 represents white. To aid reproducibility of the image, the image has been dithered to include only black tones, but the reader will recognize that the image itself includes tones varying smoothly across the greyscale range between 0 and 1.

If the random seed is not changed, there are few parameters that affect the generation of this image and so, by itself, it might not be an appropriate texture for optimizing via the process 100 of FIG. 1. It would not normally be desirable to include the random seed itself as used to create this noise image in the parameters of a parameterized texture model because small changes to the random seed would create large changes in the resulting image, and thus present a difficulty in optimizing via small steps as per an evolutionary algorithm. It would not be expected to provide the preferred smooth fitness landscape.

However more parameters are available for uniquely defining a texture or pattern based on the noise when this image is processed by one or more parameterized functions.

Figure 4:
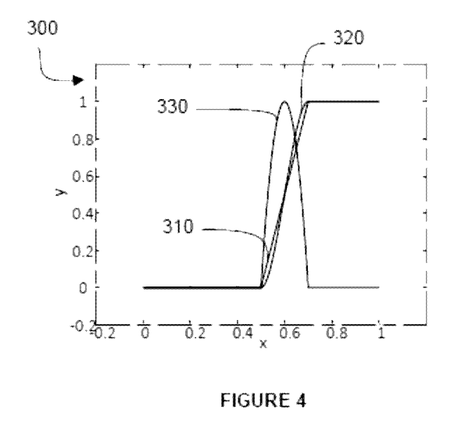
FIG. 4 is a plot of several parameterized mapping functions.

FIG. 4 is a plot 300 of three mapping functions which each take an input value in the range of 0 to 1 and provide an output value in the range of 0 to 1. A linear step function 310 is defined by two edge values, in this case 0.5 and 0.75, although these may be varied and indeed may constitute parameters defining a pattern or texture. For inputs below the first edge value, 0.5, the function returns 0. For inputs above the second edge value, the function returns 1. For inputs between the first and second edge values, the function returns a value linearly interpolated between 0 and 1 according to the extent to which the input value has exceeded the first edge value. Specifically, in the intermediate region it returns a value according to the following expression: f=(input_value−first_edge_value)/(second_edge_value−first_edge_value).

A smooth step function 320 is also defined by two edge values, in this case 0.5 and 0.75 as example values. The smooth step function 320 returns 0 for inputs below the first edge value and 1 for inputs above the second edge value. For inputs between the first and second edge values the function returns a value smoothly interpolated between 0 and 1 according to the extent to which the input value has exceeded the first edge value. The interpolation is performed using a sigmoid-like function having a slope of zero at both edges, defined by the following expression: f=x*x*(3−2*x), where x=(input_value−first_edge_value)/(second_edge_value−first_edge_value).

A parabolic function 330 is also defined by two edge values, returning 0 for inputs below the first edge value and 0 for inputs above the second edge value. For inputs between the first and second edge values the function returns a value between 0 and 1 according to a parabola that reaches its peak value of 1 at the midpoint between the first and second edge values, and passes through the first and second edge values at 0. The parabola has the form of the following expression: f=a*input_value^2+b*input_value+c, where the values of a, b, and c are determined according to the first and second edge values. For edge values of 0.5 and 0.75, as per FIG. 4, the coefficients a, b, and c are given respectively by −100, 80, and −15. For other edge values, the values of a, b and c can be obtained by substituting first_edge_value, 0.5*(first_edge_value+second_edge_value), second_edge_value as input values for f=0, 1 and 0 respectively in the expression above, and solving the system of three linear equations for a, b and c.

The mapping functions are not limited to those set out above. But, in most cases other mapping functions can be approximated satisfactorily using combinations of the above functions. For example, even the parabolic function 330 can be approximated using two linear functions 310 or smooth step functions 320, one offset from the other and having a −1 weighting applied to it. In some embodiments the mapping functions are parameterized by a 'width' value and a 'centre point' value.

Figure 5:
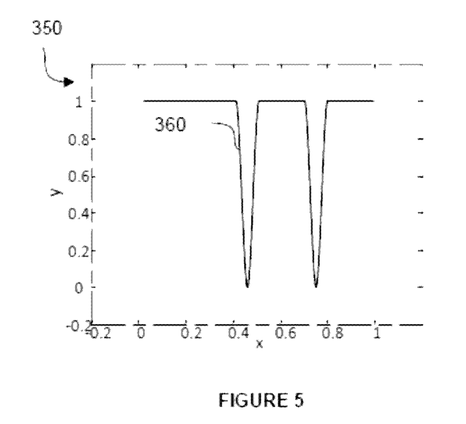
FIG. 5 is a plot of several parameterized mapping functions in combination to provide more complicated mapping behaviour.

FIG. 5 is a plot 350 of four smooth step functions 320 combined together with alternate weightings of −1, +1, −1, +1, each having different edge values. A first smooth step function has weighting −1 and a first edge value of 0.4 and a second edge value of 0.45. A second smooth step function has weighting +1 and a first edge value of 0.45 and a second edge value of 0.5. A third smooth step function has weighting −1 and a first edge value of 0.7 and a second edge value of 0.75. A fourth smooth step function has weighting +1 and a first edge value of 0.75 and a second edge value of 0.8. Thus, for input values lower than 0.4, the combined mapping function returns 1. It returns a value between 0 and 1 for input values between 0.4 and 0.5. It returns 1 for input values between 0.5 and 0.7. It returns a value between 0 and 1 for input values between 0.7 and 0.8. It returns 1 for input values between 0.8 and 1. Thus, when applied to each pixel of an image that has pixel values between 0 (black) and 1 (white), the resulting image would be expected to be largely white except for regions in the original image having grey values between 0.4 and 0.5 and between 0.7 and 0.8, in which regions it would be expected to vary between white and black. For images where the pixel values vary smoothly between black and white, the resulting image would be expected to show banding and rings of black on a white background. Thus parameterized functions can be obtained that depend on the edge values as set out above and the coefficients applied to the mapping functions.

Figure 6:
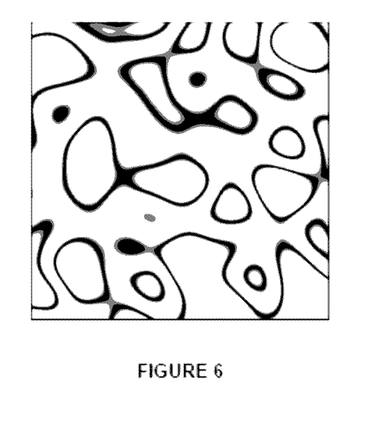
FIG. 6 is an image of the greyscale simplex noise field of FIG. 3 when processed according to the combined parameterized mapping functions of FIG. 5

FIG. 6 illustrates the image of FIG. 3 following an application of the pixel mapping function plotted in FIG. 5 to the pixel values of the image. The resulting image shows banding and non-circular rings of black on a white background according to the pixel value fluctuations in the simplex noise field from which the image of FIG. 3 was obtained.

By combining multiple mapping functions, such as one or more of the functions shown in the plot 300 of FIG. 4, each with a coefficient or weighting determining the degree to which the mapping function contributes, each with edge values determining the range of pixel values in the original image where the mapping function takes effect, the original noise field can be processed to obtain patterns such as the pattern shown in FIG. 6, which may be dependent on multiple parameters.

The image of FIG. 6 shows the mapping applied to an image (that of FIG. 3) obtained from a single static noise field. But a greater variety of patterns can be obtained by combining images of multiple noise fields together, at least one moving relative to the other according to a 'time' value that itself may be a further parameter of a texture model. As the time value increases, the noise fields cross each other according to a velocity, temporarily forming peaks and troughs in different locations across the resulting image according to the underlying noise patterns. The application of the parameterized mapping functions means that, at some 'time' values, peaks of separate noise fields combine and present pixel values within the ranges in which the parameterized mapping functions take effect, providing patterns—dots, blobs, rings etc.—that move and change shape for different 'time' values.

One of the noise fields may be stationary with the other noise field moving relative to it according to its velocity and 'time' value. Alternatively, both noise fields (or indeed any number of noise fields) may move according to respective velocities and time values. For each noise field, the velocity may be a particular magnitude and direction; both magnitude and direction for each noise field may be a parameter of the texture model. The velocity field for moving a noise field according to the time value does not need to be constant. For example, the magnitude or direction, or both, may vary according to a linear gradient across the image, the direction and steepness of the gradient being possible further parameters of the texture model. Additionally or alternatively a radial gradient centred on a location within the image may determine variation of the velocity field, radially or tangentially, once again set as parameters of the texture model. Additionally or alternatively, a velocity field may itself be a function of a further noise field, by which different portions of a first noise field undergo transformations—bending, stretching—in different directions according to collocated values in a second noise field. Additionally or alternatively, a velocity field may be based on, for example, a trigonometric function of the 'time' value, location of a pixel within an image, or a pixel value within a same or different noise field, or some combination thereof. The application of any of the above-mentioned functions may be parameterized and a pattern or texture may be uniquely procedurally generated by the values of the parameters. The skilled reader will recognize some of these techniques and operations as representing the application of a 'turbulence' to a noise field.

In an embodiment, the set of parameters consists of 16 parameters according to Table 1, in which four smooth step mapping functions are controlled by a respective three parameters, and the direction and magnitude of two (uniform) velocity fields are controlled by two sets of two parameters:

TABLE 1

| Parameter | Purpose |
| --- | --- |
| 1 | Coefficient by which first smooth step function is multiplied |
| 2 | First edge value of first smooth step function |
| 3 | Second edge value of first smooth step function |
| 4 | Coefficient by which second smooth step function is multiplied |
| 5 | First edge value of second smooth step function |
| 6 | Second edge value of second smooth step function |
| 7 | Coefficient by which third smooth step function is multiplied |
| 8 | First edge value of third smooth step function |
| 9 | Second edge value of third smooth step function |
| 10 | Coefficient by which fourth smooth step function is multiplied |
| 11 | First edge value of fourth smooth step function |
| 12 | Second edge value of fourth smooth step function |
| 13 | Direction of first velocity field |
| 14 | Magnitude of first velocity field |
| 15 | Direction of second velocity field |
| 16 | Magnitude of second velocity field |

Figure 7:
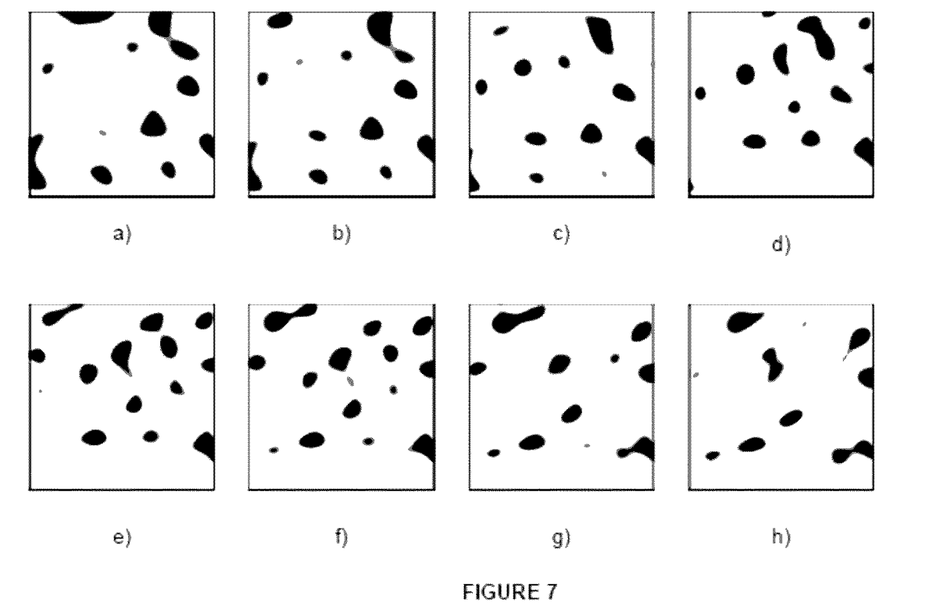
FIG. 7 consists of eight example texture images corresponding to a sequence of 'time' snapshots generated according to dynamic velocity fields and parameterized mapping functions.

FIG. 7 shows eight example texture images a) to h), that correspond to a sequence of 'time' snapshots. As the 'time' value is varied, the pattern evolves from image a) to image h). In this case, the pattern is generated from a first noise field moving uniformly in one direction and a second noise field moving in a time varying velocity field dependent on values of another noise field.

An example implementation of such a noise field is given by the WebGL 'Lava lamp' example in Chapter 11 of The Book of Shaders (authors Patricio Gonzalez Vivo & Jen Lowe, material available by way of the following URL: https://thebookofshaders.com/).

Embodiments according to the present disclosure are not limited to the particular examples of procedural pattern generation as described herein. One alternative approach is to generate a pattern based on parameters using a compositional pattern-producing network. Other example approaches will be apparent to the skilled reader, whereby parameters describe the generation of a pattern by parameterizing, e.g. a brush stroke size, a brush stroke direction, a 'blotchiness', a 'stripy-ness', colours, contrast, any geometric transformations, any filtering, any smoothing etc.

Figure 8:
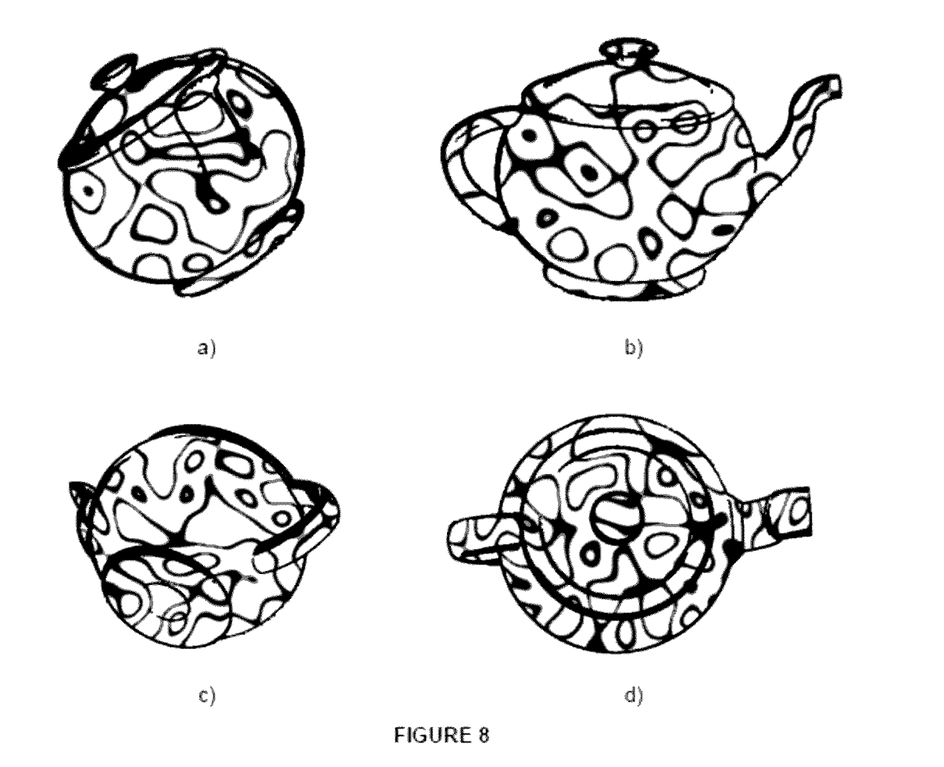
FIG. 8 consists of four example images illustrating a digital 3D model of teapot rendered from different angles with a texture applied to its surface.

FIG. 8 shows four images a) to d) rendered of a digital 3D model of a teapot viewed from various positions around the 3D model. The views show a pattern similar to that of FIG. 6 applied to the surface. In this example the pattern was projected onto the surface but in other embodiments the texture is mapped to conform to the surface of the digital 3D model.

Such images can be generated using any of a number of 3D rendering software packages. One example is Blender (https://www.blender.org), with which rendering can by controlled via a Python interface. Another example is Panda3D (https://www.panda3d.org/), designed primarily as a game engine but capable of direct control via a Python interface. The control of Panda3D for rendering 3D images via Python may provide for a particularly simple Python-based solution when combined the use of DEAP for implementing a genetic algorithm.

In the example images shown in FIG. 8, the texture is a two-dimensional image. However, an alternative approach, which may avoid the stretching of the texture to map to the surface of the digital 3D model, is to generate one or more three-dimensional noise fields and therefore a three-dimensional or 'solid' texture. As part of the rendering process, determining the texture colour at any point on the surface of the 3D model comprises determining the intersection of the surface of the 3D model with the solid texture in 3D space and setting the texture colour to the corresponding colour of the solid texture at the intersection with the surface of the 3D model. Such an approach may including interpolating a solid texture in three dimensions, using one or more of: nearest neighbour interpolation, tri-linear interpolation, and tri-cubic interpolation.

According to any of the above described techniques, the texturing of the digital 3D model may comprise combining a texture that was generated with a set of parameters and a parameterized texture model with an existing texture of the digital 3D model. The colour values at a point on the surface of the digital 3D model may be combined using one or more of various blending or mixing modes, including a multiply blend mode, a screen blend mode, an overlay blend mode, and an addition blend mode. Alternatively, the texturing of the digital 3D model may comprise using a texture that was generated with a set of parameters and a parameterized texture model without using an existing texture of the digital 3D model.

In other embodiments such images may be generated using 'fragment shader' techniques as described in the 'Book of Shaders' of Gonzalez Vivo and Lowe. This may be implemented through the use of GLSL, i.e. the openGL shading language. The use of fragment shaders and GLSL may take advantage of the capabilities of a graphics processing unit that is often included in a computer system and may provide an efficient and convenient way to generate the images corresponding to the multiple views, whereby the texture pattern is applied to a digital 3D model via the openGL fragment shader. This may be implemented using WebGL (https://www.khronos.org/), a JavaScript API for rendering graphics within a web browser, or openGL shader functionality may be accessed from compiled programs via a wrapper.

To evaluate the fitness of a set of parameters, each rendered image is assessed by object recognition software. From this assessment, a prediction is made by the object recognition software as to the likelihood or confidence that the image contain an object of one or more categories of each of the one or more categories. These categories may include the category to which the target object belongs, in which case the determined fitness for the set of parameters from that image would vary inversely with the likelihood or confidence calculated for that category; if the calculated likelihood or confidence is relatively low, then this is considered a more successful set of parameters than a set of parameters for which the calculated likelihood or confidence is relatively high, and thus a higher fitness is associated with a lower calculated likelihood or confidence that the image contains an object of the category to which the target object belongs. For example, the fitness score for the image may be based on subtracting the predicted confidence from 100%. If the object recognition software does not even suggest the category to which the target object belongs as a possible category, then this would also be considered a successful pattern and would be associated with a high fitness score.

This may be implemented using Keras (https://keras.io/) and Tensorflow (https://www.tensorflow.org/), where Keras is a high-level API that uses Tensorflow as a backend to perform neural network computations. To this platform an object recognition model must be created or installed. InceptionV3 and VGG16 are examples of publically available models, in which both the model architecture and the model weights may be readily obtained. The model architecture defines the organization of the model, including the number of layers, the number of nodes per layer, and the activation function or activation functions (step, logistic, etc.). The model weights represent all that the model has learned through training, and are obtained by training the model on image databases such as the ImageNet image database. Thus a user trains a model on an image database, or a pre-trained model is installed, or both.

From the fitness scores obtained for each of the images generated for the set of parameters, a composite fitness score is obtained by calculating a mean, such as the arithmetic mean, of the fitness scores. In some embodiments the composite fitness score is determined based on other averages or statistical measures are determined from the scores obtained for each of the images. In some embodiments the composite fitness score may also include other factors. For example, the composite fitness score may further include a weighting based on the average pixel value of the texture, favouring lighter textures or darker circumstances in some circumstances. Where the blending mode of the generated texture and any existing texture of the digital 3D model is a multiplication blending mode, a texture that is darker will result in a greater change to the external appearance of the digital 3D model due to the stronger effect of darker colours in the multiplication blending mode. In some circumstances, textures requiring a smaller modification of the external appearance of the digital 3D model may be favoured and so the composite fitness score may also include a portion that varies directly with the average pixel colour of the texture.

Embodiments or aspects of this disclosure may further be embodied by devices, apparatuses or systems comprising means for carrying out the above-described methods. For example, a device, apparatus or system for determining a surface pattern for a target object may comprise: means for providing a digital 3D model of a target object; means for providing a parameterized texture model that outputs a texture based on a set of parameters; means for providing at least one object recognition model configured to process one or more images and determine an output indicative of the object recognition model's confidence that the image contains an object matching a classification; means for, for an initial generation of a genetic algorithm, providing a plurality of sets of parameters and determining a composite fitness score for each set of parameters of the plurality of sets of parameters; and means for, for one or more further generations of the genetic algorithm, generating a new plurality of sets of parameters based on the sets of parameters and fitness scores of a preceding generation and determining composite fitness scores for each set of parameters of the new plurality of sets of parameters, wherein determining a composite fitness score for a particular set of parameters comprises: generating a plurality of images by rendering the digital 3D model from a plurality of viewpoints around the digital 3D model with the digital 3D model textured based on the parameterized texture model and the particular set of parameters; determining at least one fitness score for each image of the generated plurality of images by processing the image using the at least one object recognition model, the at least one fitness score being based on the degree to which the at least one object recognition model failed to correctly classify the image as containing the target object; and determining a composite fitness score for the particular set of parameters based on the at least one fitness score generated for each of the images of the generated plurality of images. The systems, devices or apparatuses may comprise one or more processors to perform the methods in combination with a memory store. The systems, devices or apparatus may alternatively or additionally comprise one or more field-programmable gate arrays (FPGAs) or application-specific integrated circuits (ASICs) or similar to perform all or part of the processes. The systems, devices or apparatus may include hardware modules for accelerating portions of the process, such as the graphical rendering or the neural network operations.

Embodiments or aspects of this disclosure may further be embodied by the following process and by systems, devices or apparatuses configured to perform such a process, either by a memory store and one or more processors configured to perform the steps of the process, or by any other means for performing the steps of the process, the process comprising: the following steps A) to H): A) Provide a 3D model of a 3D object, having an exterior surface thereof; B) Provide a pattern generator adapted to generate a brightness or colour pattern for the exterior surface, in accordance with a plurality of parameters, such that a small change in the parameter(s) causes a small change in the brightness or colour pattern on the exterior surface; C) Provide a plurality of codes, each code comprising values for each of the parameters; D) Provide an image renderer, adapted to render a 2D image of the exterior surface of the model, as modified by a brightness or colour pattern generated by the pattern generator, as viewed from a particular viewing direction; E) Provide at least one artificial neural network digital image classifier (or alternatively a support vector machine image classifier), trained on an image dataset of digital images of objects, adapted to output a level of confidence that the image is of a particular type of object, as a value; F) Define a quantitative fitness function; G) Iteratively: a) Generate codes comprising the parameters, test the codes by generating a brightness or colour pattern in accordance with the parameters, render 2D images of the exterior surface of the model, as modified by the brightness or colour pattern, from each of a plurality directions, apply the artificial neural network digital image classifier to each of the 2D images to provide a level of confidence, to provide a level of confidence, and apply the quantitative fitness function to generate a quantitative fitness value; and b) In doing so, apply an optimisation algorithm (preferably a genetic algorithm) to generate subsequent codes to seek a maximised fitness value; and H) Provide as an output, the pattern, or the parameters required to generate it using the pattern generator, providing the maximum fitness value, as an optimal camouflage pattern for production or modification of the 3D object.

The skilled reader will appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. The skilled reader may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

The invention claimed is:

1. A method of determining a surface pattern for a target object, the method comprising:
   providing a digital 3D model of a target object;
   providing a texture model having a set of texture model parameters, wherein the texture model outputs a texture based on the set of texture model parameters;
   providing an object recognition model configured to process an image and determine an output comprising a classification and a respective confidence of the object recognition model that the image contains an object matching the classification;
   providing, to a genetic algorithm, a plurality of sets of genetic algorithm parameters;
   determining, for each set of genetic algorithm parameters of the plurality of sets of genetic algorithm parameters, a respective composite fitness score;
   generating, using the genetic algorithm, a new plurality of sets of genetic algorithm parameters based on the sets of genetic algorithm parameters and the composite fitness scores; and
   determining new composite fitness scores for each set of genetic algorithm parameters of the new plurality of sets of genetic algorithm parameters,
   wherein determining a composite fitness score for a particular set of parameters comprises:
      generating a plurality of images by rendering the digital 3D model from a plurality of viewpoints around the digital 3D model with the digital 3D model textured based on the texture model and the particular set of parameters;
      determining a respective fitness score for each image of the generated plurality of images by processing the image using the object recognition model, the respective fitness score based on a degree to which the object is incorrectly classified by the object recognition model as containing the target object; and
      determining a composite fitness score for the particular set of parameters based on the fitness score generated for each of the images of the generated plurality of images.

2. The method of claim 1, wherein new pluralities of sets of parameters are generated and corresponding new composite fitness scores are determined until termination criteria are reached, such that an optimized set of parameters is obtained.

3. The method of claim 1, wherein generating a new plurality of sets of genetic algorithm parameters based on the sets of genetic algorithm parameters and fitness scores of a preceding generation comprises selecting one or more of the sets of genetic algorithm parameters of the preceding generation based on the fitness scores determined for the sets of genetic algorithm parameters and modifying the selected one or more sets of genetic algorithm parameters.

4. The method of claim 3, wherein modifying the selected one or more sets of parameters comprises performing a mutation operation on one or more of the selected one or more sets of parameters.

5. The method of claim 3, wherein a plurality of sets of parameters of the preceding generation are selected, and wherein modifying the selected plurality of sets of parameters comprises performing a crossover operation using two or more of the selected plurality of sets of parameters.

6. The method of claim 1, wherein views used to determine a composite fitness score for a particular set of parameters are varied between one or more of: each set of parameters, and each generation of the genetic algorithm.

7. The method of claim 1, wherein at least one view used to determine a composite fitness score for a particular set of parameters is determined randomly.

8. The method of claim 1, wherein generating a plurality of images by rendering the digital 3D model comprises varying one or more of the following between at least some of the plurality of images: lighting condition, environmental condition, projection, model reflectivity, and background scenery.

9. The method of claim 1, wherein determining at least one fitness score for each image of the generated plurality of images by processing the image using the object recognition model comprises processing the image using a plurality of object recognition models to obtain a plurality of fitness scores for the image.

10. The method of claim 1, wherein the texture model outputs a planar texture and rendering the digital 3D model comprises mapping the planar texture to a surface of the digital 3D model.

11. The method of claim 1, wherein the texture model outputs a solid texture and rendering the digital 3D model comprises determining colour values at positions within the solid texture that correspond to positions on the digital 3D model.

12. The method of claim 1, wherein determining a fitness score for an image comprises processing the image using the object recognition model to obtain, for each of one or more categories, an indication of the object recognition model's confidence that the image contains an object of the category.

13. The method of claim 12, wherein the determined fitness score for an image varies inversely with the object recognition model's confidence that the image contains an object of the same category as the target object.

14. The method of claim 12, wherein the determined fitness score for an image varies directly with the object recognition model's confidence that the image contains an object of a predefined category that is different from the category of the target object.

15. The method of claim 1, wherein determining a composite fitness score for the particular set of parameters based on the fitness scores generated for each of the images of the generated plurality of images comprises obtaining an average of the fitness scores.

16. A computer system for determining a surface pattern for a target object, the computer system comprising a memory store and one or more processors, the one or more processors configured to:
   provide a digital 3D model of a target object;
   provide a texture model having a set of texture model parameters, wherein the texture model outputs a texture based on the set of texture model parameters;
   provide an object recognition model configured to process an image and determine an output comprising a classification and a respective confidence of the object recognition model that the image contains an object matching the classification;
   provide, to a genetic algorithm a plurality of sets of genetic algorithm parameters;
   determine, for each set of genetic algorithm parameters of the plurality of sets of genetic algorithm parameters, a respective composite fitness score;

generate, using the genetic algorithm, a new plurality of sets of genetic algorithm parameters based on the sets of genetic algorithm parameters and the composite fitness scores and determine new composite fitness scores for each set of genetic algorithm parameters of the new plurality of sets of genetic algorithm parameters, wherein determining a composite fitness score for a particular set of parameters comprises:

generating a plurality of images by rendering the digital 3D model from a plurality of viewpoints around the digital 3D model with the digital 3D model textured based on the texture model and the particular set of parameters;

determining a respective fitness score for each image of the generated plurality of images by processing the image using the object recognition model; the respective fitness score based on a degree to which the object is incorrectly classified by the object recognition model as containing the target object; and determining a composite fitness score for the particular set of parameters based on the fitness score generated for each of the images of the generated plurality of images.

17. The computer system of claim 16, further configured to perform a method of determining a surface pattern for a target object.

18. A non-transitory computer-readable medium having instructions stored thereon that, when executed by one or more processors, cause the one or more processors to:

provide a digital 3D model of a target object;

provide a texture model having a set of texture model parameters, wherein the texture model outputs a texture based on the set of texture model parameters;

provide an object recognition model configured to process an image and determine an output comprising a classification and a respective confidence of the object recognition model that the image contains an object matching the classification;

provide, to a genetic algorithm, a plurality of sets of genetic algorithm parameters;

determine, for each set of genetic algorithm parameters of the plurality of sets of genetic algorithm parameters, a respective composite fitness score;

generate using the genetic algorithm, a new plurality of sets of genetic algorithm parameters based on the sets of genetic algorithm parameters and the composite fitness scores; and determine new composite fitness scores for each set of genetic algorithm parameters of the new plurality of sets of genetic algorithm parameters, wherein determining a composite fitness score for a particular set of parameters comprises:

generating a plurality of images by rendering the digital 3D model from a plurality of viewpoints around the digital 3D model with the digital 3D model textured based on the texture model and the particular set of parameters;

determining a respective fitness score for each image of the generated plurality of images by processing the image using the object recognition model, the respective fitness score based on a degree to which the object is incorrectly classified by the object recognition model as containing the target object; and determining a composite fitness score for the particular set of parameters based on the fitness score generated for each of the images of the generated plurality of images.

19. The non-transitory computer-readable medium of claim 18, having instructions stored thereon that, when executed by one or more processors, cause the one or more processors to perform a method of determining a surface pattern for a target object.

* * * * *